Nov. 21, 1950     W. F. BIXBY     2,530,852
PRODUCTION OF DRY POWDERY THERMOPLASTIC COMPOSITIONS
Filed Sept. 4, 1947     2 Sheets-Sheet 1

Inventor
Willard F. Bixby
By Ernest K. Bean
Atty

Nov. 21, 1950  W. F. BIXBY  2,530,852
PRODUCTION OF DRY POWDERY THERMOPLASTIC COMPOSITIONS
Filed Sept. 4, 1947  2 Sheets-Sheet 2
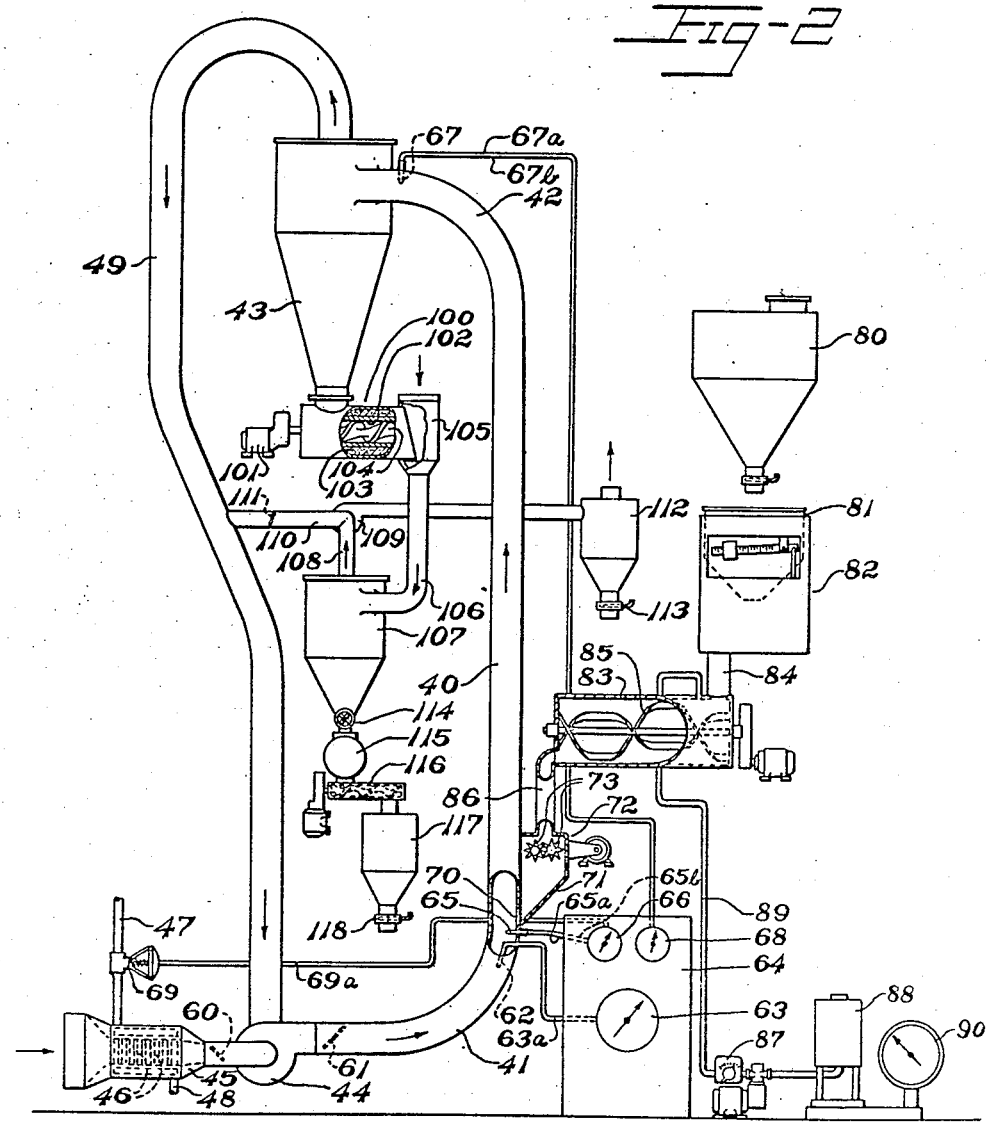

Patented Nov. 21, 1950

2,530,852

UNITED STATES PATENT OFFICE 2,530,852

PRODUCTION OF DRY POWDERY THERMO-PLASTIC COMPOSITIONS

Willard F. Bixby, Cleveland, Ohio, assignor to The B. F. Goodrich Company, New York, N. Y., a corporation of New York Application September 4, 1947, Serial No. 772,133

3 Claims. (Cl. 260—34.2)

This invention relates to the production of dry powdery thermoplastic compositions by the incorporation of compounding materials in synthetic resin-like materials. The present invention more particularly relates to a method of producing dry, free-flowing and powdery or pulverulent thermoplastic compositions, for use in extrusion and injection molding, comprising vinyl resins, plasticizing materials and, if desired, other dry and powdery coloring and compounding ingredients.

It is well known that plasticizers, particularly those which are liquid at normal temperatures and those which are easily liquefiable, may be added to tough and horny resins, particularly the vinyl resins, in order to render them more thermoplastic and more pliable and rubber-like. In preparing such rubbery plasticized resins it is customary to mix the dry, granular or powdered resin with the plasticizer on a heated rubber or plastic roll mill or in a heated internal mixer. The resin-plasticizer mixture, with or without other compounding ingredients, is heated and compacted by mastication until a smooth and continuous, plastic and workable, rubbery mass is obtained, which may subsequently be formed into sheets and/or granulated for use in extrusion or injection molding.

These operations, however, involve subjecting the resin to high temperatures for a time sufficient in many instances to initiate and accelerate breakdown or decomposition of the resin or certain of the compounding ingredients. For instance, when the resin is a polymer of vinyl chloride or vinylidene chloride or copolymers of these compounds with each other or with other monomeric materials copolymerizable therewith such as methyl methacrylate, methyl or ethyl acrylate or vinyl acetate and others, and also when it is compounded with fillers and dyes or coloring materials, the high temperatures necessary for plasticization produce several undesirable results. The dyes and coloring materials are decomposed in an unpredictable fashion; consequently it is difficult to match the colors of one batch against another of the same composition. Furthermore, chemical breakdown of the resin, particularly of a chlorine-containing resin, is initiated by the prolonged heating, with the result that the electrical resistivity and heat and light stability of the composition are often seriously impaired. In addition, the pulverulent vinyl resin compositions for extrusion or injection molding, as made by the conventional processes involving mastication and compacting of the resin to form a plastic workable mass which is subsequently reduced to a granular composition, have been objectionable because they jam-up or "bridge" in the feed hoppers of the extruders or injection molding machines.

It is the principal object of this invention, therefore, to provide a method of incorporating plasticizers and other compounding ingredients in resins, which method will result in the production of resin compositions of improved electrical properties, better heat and light stability, improved processability, and other improved properties.

It is a further object of this invention to provide a method of incorporating plasticizers and other compounding ingredients into resins, particularly vinyl chloride polymers, so as to form dry, freely flowable, pulverulent, non-rubbery resin compositions more suitable for extrusion molding, injection molding and low-temperature coating and calendering operations, than the rubbery plasticized resin compositions heretofore used. Other objects will be apparent from the following description of the invention.

I have discovered that these and other objects may be attained and that plasticizing materials and, if desired, other compounding ingredients, can be incorporated into a pulverulent vinyl resin to form a dry, freely flowable pulverulent thermoplastic resin composition which feeds through the hoppers of extrusion and injection molding machines without bridging and sticking and which possesses numerous other desirable properties.

I have found that such a composition is prepared when a mixture of a finely-divided resin and a plasticizer is brought in contact with a moving body of heated air or other suitable gas such as combustion gases, etc., in a manner so as to maintain the mixture of resin and plasticizer in a dispersed state and thereby quickly and uniformly to heat the individual particles of resin and cause the plasticizer to be absorbed into the resin, to form a powdery or pulverulent material which is dry, free-flowing and free from lumps and agglomerates. The mixture of resin and plasticizer may be prepared by separately introducing the resin and plasticizer into the gas stream so as to effect admixing of the two in the dispersed state, or the mixing of the resin and plasticizer may be effected either by mixing dry powdery resin with plasticizer or by adding plasticizer to a stirred aqueous dispersion of the resin and then filtering.

The method of the invention may be carried out by dispersing a mixture of resin and plasticizer in a rapidly moving body of heated gas for a time sufficient to raise the temperature of the resin particles to a point where absorption of the plasticizer by the resin is complete within the holdup time of the apparatus, in which event the mixture of resin and plasticizer emerges from the gas stream as a dry pulverulent powder. Alternatively, and more preferably, provisions may be made for collecting the suspended particles of resin and plasticizer after the resin has reached the desired temperature and for maintaining and agitating the partially plasticized resin at the elevated temperature until absorption of the plasticizer is complete.

The mixture of resin and plasticizer is preferably heated by the gas stream only to moderate temperature, below the fusion or softening temperature of the composition, and ordinarily in the range of 150 to 250° F. when vinyl chloride polymers are used. The heated stream of gas need only be maintained at a temperature sufficient to cause the temperature of the resin-plasticizer mixture to rise rapidly to the preferred plasticization temperature. When the time of contact of the resin-plasticizer mixture with the heated gas stream is less than about 5 seconds, the preferred temperature of the gas stream is in the range of 175 to 340° F. As a further example, when the gas temperature is about 265° F. to 340° F. the time of contact between the resin-plasticizer mixture and the heated air need be less than 1 second in order to heat the resin particles to 200° F. or above, a temperature usually high enough to cause a finely-divided vinyl chloride polymer to absorb plasticizer after being agitated for an additional period of one minute or less. When the temperature of the gas is 200 to 250° F. the time of contact between the plasticizer-resin mixture and the gas need be 1 second or more (during heat up) and the heated resin-plasticizer mixture will require a longer period of agitation or "soaking" period to absorb the plasticizer because of the reduced effective temperature during plasticization.

The time of contact between the gas and the resin-plasticizer mixture during the heating period will also depend in some degree on the particle size of the resin. For example, a resin having an average particle size of 50 to 100 microns will require only a fraction of a second contact with the heated gas to be thoroughly heated to the desired temperature. If larger particle size resins are used in the apparatus to be hereinafter described, it is necessary only to extend the length of the duct system to provide a longer contact time between the gas and the suspended resin. In any case, it is possible to obtain contact time between the gas and the resin-plasticizer mixture sufficient to obtain the desired heating of the resin in a duct system of practical length, provided the resin is not too coarse, the particles being sufficiently small, for example, to pass a 10 to 20 mesh screen.

After the resin-plasticizer mixture is heated by the hot gas stream, it is preferably separated from the gas stream and then held at the elevated temperature for an additional period of time to complete plasticizer absorption. It is usually necessary to agitate the partially plasticized resin during this "soaking" period in order to prevent particle-to-particle coalescence and sticking of the resin to the heated metal surfaces of the mixing equipment. The character of the agitation is preferably such that the partially plasticized resin material will be kept in continual movement and the entire body of material will be efficiently intermixed. The preferred type of mixing equipment is an insulated internal mixer having a ribbon blade agitator or screw impeller extending the full length of the interior and adapted to move the material from one end near the material feed inlet to the other end for discharge. The agitator or screw preferably should agitate the partially plasticized resin material without exerting pressure on the resin, that is, without any wiping or smearing action, for at elevated temperatures coalescence of the resin particles, if they are under pressure, is apt to occur.

It will be understood that the temperature to which the original mixture of resin and plasticizer must be heated by the hot gas stream and the length of time it must be held at the elevated temperature to produce absorption of the plasticizer will also vary with each particular plasticizer being used. For example, when polyvinyl chloride is plasticized with 50 parts of di-2-ethylhexyl phthalate to 100 parts of resin, absorption of the plasticizer occurs when the plasticizer-coated resin particles are suspended in air heated to 265° F. for a fraction of a second until the resin particles have reached a temperature of at least about 210° F. and the heated particles are collected and held at that temperature for about another minute. With a given plasticizer and resin the time required at a given temperature for absorption of the plasticizer by the resin will be substantially proportional to the amount of plasticizer to be absorbed.

The amount of plasticizer which may be absorbed by powdered or pulverulent resin will be determined, of course, by the kind of resin employed and the particular plasticizer being used. Generally, however, it is possible in one absorption stage to produce freely flowable pulverulent resin-plasticizer blends containing as high as 125 parts or more by weight of the plasticizer to each 100 parts by weight of the resin. For example, resin-plasticizer compositions of 53 parts by weight of di-2-ethylhexyl phthalate plasticizer and 47 parts by weight of polyvinyl chloride resin may be prepared which are dry and freely flowing in character, and which are extremely useful in coating and calendering operations. If the resulting plasticized pulverulent resin is subjected to subsequent similar absorption treatments greater amounts of plasticizer may be absorbed, for example, if the foregoing plasticized pulverulent polyvinyl chloride composition is subjected to further absorption stages a pulverulent polyvinyl chloride composition is obtained containing as high as 200 parts or more by weight of di-2-ethylhexyl phthalate per 100 parts of polyvinyl chloride which retained its original free-flowing pulverulent nature.

After heating the resin-plasticizer mixture with a hot gas stream, separating the suspended material, and then, if necessary, agitating the heated mixture to allow the prasticizer to be absorbed and become a dry free-flowing powder, other powdery and finely-divided compounding ingredients including dyes and other coloring substances, pigments, reinforcing agents, fillers, etc., may be mixed with the dry, powdery, free-flowing plasticizer-containing resin to form a free-flowing, pulverulent compounded composition in which the finely-divided compounding ingredients are well-dispersed through and about the resin particles. The resin-plasticizer composition produced by the air-plasticization method of this invention, with or without such added compounding ingredients, may subsequently be extruded or formed by injection molding, compacted into films and sheets on rubber or plastic roll mills and coating calenders, or dissolved in solvents and applied as coatings to fabric.

The pulverulent plasticized resin compositions of this invention are thermoplastic and soften very readily in final forming operations such as extrusion or injection molding, due in part to the prior complete absorption of the plasticizer and the inherent homogeneous nature of the composition. Consequently, the time during which such compositions are subjected to high temperatures in forming useful articles, is much less than with compositions prepared by conventional processes involving mill mixing, grinding and then forming, since the resin composition is heated to the plastic state of fusion only during the final forming operation and then is cooled immediately thereafter.

It has been found difficult to produce a dry, free-flowing, non-rubbery composition in which a liquid or liquefiable plasticizer and large amounts of dry finely-divided compounding ingredients such as pigments, dyes and fillers, are added to the pulverulent resin in one operation. The finely-divided or powdered compounding ingredients absorb a large amount of the plasticizer and under such conditions the final composition will not be fully dry and free-flowing in character but will be slightly oily or mealy. In the practice of this invention, it is accordingly preferred that the powdered resin and the plasticizer alone, or with only small amounts of other finely-divided materials such as, for example, from 1 to 10 percent based on the resin of finely-divided stabilizers or coloring agents for the resin, be first mixed together to form a moist, mealy composition, and the moist composition be separately exposed to the heated air and agitated until complete absorption of the plasticizer has occurred. After absorption of the plasticizer is complete, any desired amounts of dry and powdery compounding ingredients may be admixed with the resin-plasticizer powder.

The dry, free-flowing powdery or plastic composition resulting from the air heating method of this invention looks and feels much like the original unplasticized pulverulent resin in that it is dry and non-rubbery in character and has a friable "feel." By adjusting the temperature and the time of exposure to the absorption temperature, such a degree of absorption of plasticizer is obtained, that when the resulting powder is placed in absorbent paper bags for storage, the bags remain unspotted showing the plasticizer has been absorbed.

When the plasticizing material has been absorbed by the resin and preferably, but not necessarily, after the resin-plasticizer mixture has been cooled to substantially room temperature, the remaining powdered compounding ingredients, if any, of the plastic composition may be added, and mixing continued until a homogeneous, dry, non-rubbery, free-flowing mixture is obtained. If the resin-plasticizer powder is first cooled to room temperature, the blending of the powdered or granulated compound ingredients into the resin-plasticizer mixture may be performed in a mixer of the type which exerts a rubbing, smearing or pulverizing action on the pulverulent material so as to crush lumps in the pigments and fillers, thus insuring the production of a product of fine particle size which is free from agglomerates. The cooled pulverulent material with or without adding compounding ingredients, may be mixed in a Mikropulverizer, muller, or other type of mixers such as are in use in the paint industry.

The method of this invention may be utilized to accomplish the plasticization of hard, tough and horny thermoplastic resinous materials and particularly to the plasticization of resinous polymers made by the polymerization of monomeric materials which contain a single methylene group attached to a carbon atom by a double bond, that is, compounds which contain a single $CH_2=C<$ group, and which undergo additional polymerization to form high molecular weight linear polymers. Illustrative examples of monomeric materials from which polymers may be prepared which may be plasticized according to the method of this invention are the ethylenically unsaturated mono-olefins such as ethylene, propylene, butylene, isobutylene and others; styrene, p-chlorostyrene, vinyl naphthalene, and others; the vinyl esters such as vinyl chloride, vinyl bromide, vinyl fluoride, vinyl acetate, vinyl acetate, vinyl propionate, vinyl butyrate, vinyl benzoate, and others; esters of alpha-methylene aliphatic monocarboxylic acids, such as methyl acrylate, ethyl acrylate, n-butyl acrylate, isobutyl acrylate, dodecyl acrylate, n-octyl acrylate, 2-chloroethyl acrylate, 2-chloropropyl acrylate, 2,2'-dichloroisopropyl acrylate, phenyl acrylate, cyclohexyl acrylate, methyl-alpha-chloroacrylate, methyl methacrylate, ethyl methacrylate, methyl ethacrylate, and others; acrylonitrile; methacrylonitrile; acrylamide; vinyl ethers, such as vinyl methyl ether, vinyl isobutyl ether, vinyl-2-chlorethyl ether, vinyl ethyl ether, vinyl octadecyl ether, and others; vinyl ketones, such as vinyl methyl ketone, vinyl hexyl ketone, methyl isopropenyl ketone; vinylidene halides, such as vinylidene chloride, vinylidene chlorofluoride, and others; N-vinyl compounds, such as N-vinyl pyrrole, N-vinyl carbazole, N-vinyl indole, N-vinyl pyrrolidene, N-vinyl succinimide, and others, and other similar polymerizable materials. The method of this invention is also applicable to the plasticization of polymers made by the polymerization of mixtures of two or more of these monomeric materials.

The invention finds its most important application in the plasticization of polymers made by the polymerization of those monomeric materials which comprise predominantly a chloroethylene containing from one to two chlorine atoms on one only of the carbon atoms, and having only hydrogen atoms attached to the remaining valences of the ethylenic carbon atoms. Included in such materials are, for example, vinyl chloride, vinylidene chloride, mixtures of these monomers with each other and with lesser proportions of one or more other copolymerizable monomers such as vinyl acetate, vinyl propionate, vinyl butyrate, esters of alpha-methylene aliphatic monocarboxylic acids, particularly alkyl esters, such as methyl acrylate, ethyl acrylate, methyl methacrylate, ethyl methacrylate, methyl ethacrylate, butyl acrylate, dodecyl acrylate, or the like, and other monomeric substances such as diethyl fumarate, diethyl monochloromaleate, ethyl maleate, isobutyl crotonate, ethyl crotonate, methyl crotonate, allyl hydracrylate, vinyl isopropyl ether, vinyl butyl ether, 2-vinyl furane, and others.

The resin for use in the method of this invention may be made by any of the methods known to the art such as emulsion polymerization, pearl-type or granular polymerization, polymerization in solution and mass polymerization methods. It is preferred, however, that the resins for use in the method of this invention be made by the emulsion method or by the "pearl" or granular polymerization method because it is possible by these methods to obtain a granular or powdered resin of a suitable state of division and having good absorptive characteristics.

For a better understanding of the instant invention reference may be had to the drawings which illustrate preferred embodiments of apparatus for carrying out the invention in a more or less diagrammatic manner, of which:

Fig. 2 is an elevational view of a second embodiment of apparatus for carrying out the method of this invention.

Figure 1:
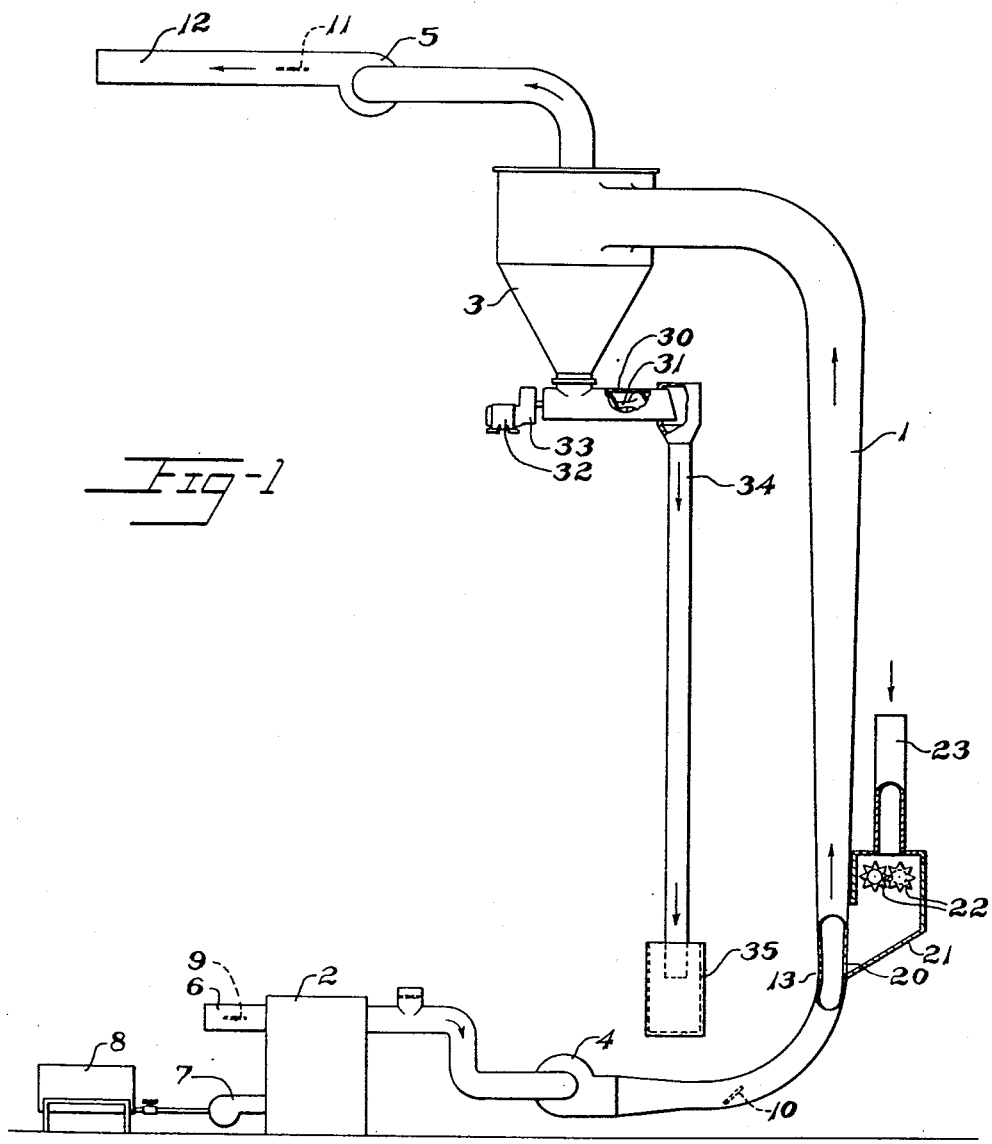
Fig. 1 is an elevational view of an illustrative apparatus for carrying out the method of this invention.

Referring to the drawings, Fig. 1 represents an illustrative apparatus for carrying out the method of this invention, comprising a Venturi column or tube 1 having at the lower end an oil-fired air heater 2 and at the upper end a cyclone separator 3. Air is circulated through the Venturi column 1 to the cyclone separator 3 by means of a centrifugal intake fan 4 and a centrifugal exhaust fan 5. Air enters the air heater 2 through the air inlet pipe 6 and is heated by direct admixture with hot exhaust gases from an oil burner 7. The oil burner 7 is supplied with oil from an oil storage tank 8.

Flow of air in the Venturi tube 1 is controlled by adjusting the speeds of the fans 4, 5 and by manipulating the position of a damper 9 in the air inlet 6, a damper 10 in the lower part of the Venturi tube 1, and another damper 11 in the air discharge pipe 12 extending from the exhaust fan 5. By suitably balancing the input of the fan 4 and the output of the exhaust fan 5 and the positions of the dampers 9, 10, 11 a slight negative pressure is induced in the throat or narrowest portion 13 of the Venturi tube 1.

At the throat 13 of the Venturi tube 1 there is provided a narrow slot-like opening 20 about which is disposed a housing 21 containing a powder feed disperser unit comprising a number of intermeshing toothed gears 22, 22 adapted to grind and disperse a pulverulent material. Pulverulent resin material enters the disperser housing 21 through a powder feed inlet tube 23 which may be a flexible rubber hose. Since there is a slightly reduced pressure at the Venturi throat 12, the particles of pulverulent material being impelled downwardly from the disperser gears 22, 22 will be sucked into the stream of air in the Venturi tube 1 and carried upward by the buoyant effect of the moving air stream and discharged into the cyclone separator 3.

Due to the centrifugal force applied to the air stream in the cyclone separator 3 the gases are separated from the pulverulent material which drops out and collects in the bottom of the separator from which it is removed by a totally enclosed screw feed conveyor comprising a tube 30 and a screw impeller 31 which is driven by an electric motor 32 acting through a gear reducer 33. The pulverulent material gradually cools in the screw feed mechanism and is discharged into a product take-off pipe 34 which drops it into a product container 35.

Fig. 2 presents an elevational view of a preferred embodiment of apparatus especially adapted to carry out this invention comprising a vertical tube 40 having at the bottom a curved portion 41 and at the top another curved portion 42 leading tangentially into the side of a cyclone separator 43. At the lower end of the tube 40 there is provided a centrifugal input fan 44 which draws air through an air heater 45 and forces it up the tube 40. The air heater 45 comprises a bundle of tubes 46, 46 connected to headers (not shown). High pressure steam is supplied to the air heater 45 through pipe 47 and condensate is withdrawn therefrom through pipe 48.

The cyclone separator 43 is provided with a tube or duct 49 which is connected to the fan 44 so as to recirculate the air and to mix it with fresh high temperature air being drawn from the air heater 45. To control the flow of air and the temperature of the air mixture, dampers are placed in the ducts, one damper 50 being placed at the exit to the air heater 45 to control the amount of fresh high temperature air entering the sysem and another damper 51 being located on the discharge side of the input fan 44 in order to control the total flow of air in the system. The apparatus is provided with means for determining the amount of air flow comprising a Pitot tube 52 disposed in the air tube 40, the Pitot tube 52 being connected by a tube 53a to a recording meter 53 located on an instrument panel 54.

To record the temperature of the air entering the air tube 40 a thermocouple 55 is located in the curved portion 41 of the air tube 40, the thermocouple 55 being connected by the wires 55a and 55b to a temperature controlling instrument 56 on the instrument panel 54. A similar thermocouple 57 is located in the upper curved portion 42 of the air tube 40 and is similarly connected by wires 57a, 57b to a recording meter 58 located on the instrument panel 54. A control valve 59 is located in the steam supply line 47 and is connected to the control instrument 56 by means of tubing 59a for transmitting air pressure from an air supply (not shown) to the valve diaphragm. Thus, the temperature of the air is controlled at a predetermined level set by the operator to obtain most efficient operation.

At a point just above the lower curved portion 41 of the air tube 40 there is provided a narrow rectangular feed slot 70 surrounded by a housing 71 in which is located a gear-type dispersing unit 72 comprising a number of toothed discs 73, 73 the faces of which intermesh leaving a space therebetween. Since the discs 73, 73 are driven at differential speeds in opposite directions the pulverulent resin in passing between the toothed discs will be pinched therebetween and subjected to shear sufficient to break up any temporary agglomerates. By suitable manipulation of the damper 50, a slight negative pressure may be induced in the curved portion 41 of the tube 40 sufficient to draw the dispersed resin out of the disperser housing 71 through the feed slot 70 and into the air tube 40 to be borne upward by the buoyant effect of the air stream.

Pulverulent resin is continuously mixed and blended with oily plasticizer in a continuous blending apparatus. The resin is periodically dropped from a dry resin storage bin 80 into the hopper 81 of a loss-in-weight type of gravimetric feeder 82 which continuously feeds dry resin into a continuous blender 83 through a tube or chute 84. The blender 83 is equipped with a continuous spiral ribbon-bladed agitator 85 which serves both to mix the resin and plasticizer and to advance the blend of resin and plasticizer toward the discharge tube 86 through which it drops into the disperser 72. Plasticizer, if liquid or liquefiable, may be supplied to the blender 83 by means of a calibrated proportioning pump 87 which draws plasticizer from a supply tank 88 and pumps it into the blender 83 through a pipe 89. The plasticizer supply tank 88, in the embodiment shown, may be located on a scale 90 in order to provide a means of accurately checking the amount of plasticizer being supplied to the blender 83.

At the base of the cyclone separator 43 there is disposed a screw conveyor for removing the product from the cyclone separator 43 comprising an insulated screw conveyor 100 driven by an electric motor 101. The conveyor 100 comprises a tube 102 having a layer of insulation 103 and a continuous worm screw 104 which takes the heated resin from the bottom of the cyclone 43 and agitates and mixes the resin while substantial cooling of the resin is prevented by the insulation layer 103 during the time it is advancing it toward the discharge end of the conveyor 100. The tube 102 of the conveyor discharges the hot resin into an enlarged portion 105 of an air duct 106 leading to a second cyclone separator 107.

The heated powder being discharged from the screw conveyor 100 is dispersed in cold air being drawn into the pipe 105 and is carried downward in the suspended state to the cyclone separator 107.

The second cyclone separator 107 is provided with an air take-off duct 108 in which is disposed an exhaust fan 109. An air duct 110 connecting the recirculating duct 49 with the exhaust fan 109 and having a damper 111 therein, is provided to permit exhaustion of excess air from the main recirculated stream passing through 49 in an amount equivalent to the make-up air added through heater 45. The exhaust fan 109 discharges the air drawn from cyclone 107 and duct 110 directly into a bag filter 112. The bag filter 112 is provided with a slide valve 113 to permit periodic removal of the small amount of residual fines removed from the air leaving the cyclone 107.

During the time the heated powder is carried by cold air to the cyclone separator 107 it is cooled by the contact with cold air so as to produce a free-flowing resin powder essentially free of agglomerates. The cooled resin may then be removed from the cyclone 107 through a rotary valve 114 and subjected, if desired, to grinding in a Mikropulverizer 115. The resulting fine resin powder is conveyed to storage through a screw conveyor 116 and discharged from the system into a product storage bin 117. Product may be bagged or otherwise removed from the storage bin 117 by actuating the slide valve 118.

In operation of the apparatus shown in Figs. 1 and 2, the input and exhaust fans are started first and the air heaters warmed up until the air from the heaters reaches the desired temperature. The metal of the apparatus is allowed to reach operating temperatures before the introduction of the moist resin-plasticizer mixture is started. The velocity of the air should be adjusted so as to prevent lodging of solid material on the walls of the duct work. Generally, however, an air velocity of 100 ft./sec. will be found sufficient to buoy up and suspend pulverulent resin which will pass a 10 mesh screen.

The invention will now be described with greater particularity with reference to certain specific examples which disclose preferred manners of performing the method of this invention as applied to illustrative resins and plasticizers, though the invention is not to be construed as limited thereto, but broadly within the scope of the claims appended hereinbelow.

EXAMPLE I

A finely pulverulent, free-flowing polyvinyl chloride polymer having an average particle size of 64 microns (95% or more passing through a 40 mesh screen) is plasticized by the method of this invention in the apparatus of Fig. 1. The polyvinyl chloride is mixed with di-2-ethylhexyl phthalate in the ratio of 2 parts by weight of resin to 1 part by weight of plasticizer in a ribbon-bladed internal mixer. The mixing is continued until an oily, mealy mixture is obtained having the plasticizer evenly distributed over the surface of the particles. The mealy resin-plasticizer mixture is placed in the feed hopper of the apparatus and fed through the material feed pipe 23.

The gas fired burner and the air-feed fan are started and the fan and burner adjusted to deliver air to the Venturi tube at a temperature of 265 to 270° F. The resin-plasticizer mixture is fed into the column of hot air at a rate of 3 lbs. per minute. The temperature of the air in the cyclone separator remains substantially constant at 204 to 208° F. during the addition of the resin. The air velocity in the Venturi tube is measured with Pitot tubes during the operation and a reading obtained of 3.125 in. of water pressure. This is equivalent to 101 ft./sec. in a 6 inch pipe or 1190 C. F. M.

A total of 20 pounds of resin-plasticizer mixture is fed through the apparatus and obtained in the form of a dry feeling, free-flowing pulverulent composition which does not stain absorbent paper storage bags upon standing for 24 hours or more. A quantitative test to determine the amount of plasticizer actually absorbed by the resin consists in placing a 2 gram sample of the plasticized pulverulent resin on a glass wool filter supported on a 100 mesh screen and the gross weight determined, about 20 c. c. of methanol is poured over the sample and after a 3 to 5 second wait suction is applied to pull the residual methanol out of the sample, and with the suction on, the resin sample is washed twice more using approximately 10 c. c. portions of methanol, and the sample dried and reweighed. The percentage loss in weight is an approximation of the amount of plasticizer present on the surface of the particles. A pulverulent resin composition produced in Example I suffers a loss of weight by the methanol extraction method of only 4.5%. A granular extrusion compound of the same composition but produced by conventional methods involving mill mixing and grinding was subjected to the methanol extraction test and was found to suffer a loss of weight of 6.8%.

The plasticized resin (containing 2 parts of resin to 1 part of di-2-ethylhexyl phthalate) obtained in Example I is compounded by the addition of finely-divided basic lead carbonate and finely-divided clay according to the following recipe:

| Material | Parts by Weight |
| --- | --- |
| Plasticised Resin: | |
| Polyvinyl chloride resin | } 150 |
| Di-2-ethylhexyl phthalate | |
| Basic lead carbonate | 10 |
| Clay | 7 |
| Total | 167 |

The ingredients are mixed until the dry resin and compounding ingredients are thoroughly blended and a homogeneous free-flowing pulverulent composition obtained. The composition is extruded as a coating for #14 copper wire in a 1½ inch extrusion machine, maintaining the temperature of the head, barrel extension and the barrel of the extruder at 350° F. while the screw is unheated. The insulation on the wire has a smooth shiny appearance, a clear natural ivory color, and gives evidence that the compounding ingredients are well dispersed in the solid wire coating. Six inch portions of the insulation are stripped from the wire and subjected to testing in a Scott L—6 tester with both weights off the machine and the jaws of the machine being separated at the rate of twenty inches per minute. Tensile strengths from 2230 to 2330 lbs./sq. in. are obtained, per cent elongation of 180 to 200%, and modulus at 100% elongation 1900 to 2100 lbs./sq. in. The insulation composition of this example is also subjected to testing for insulation resistance (K value) and D. C. resistivity after aging in water. An ivory colored polyvinyl chloride insulation of the same composition but made by mill mastication and grinding and then extruded about wire in the same extruder under the same conditions (indicated in Table I as Control) is subjected to the same physical tests and tests for electrical properties.

In the following table the electrical properties of the insulation made from pulverulent pre-plasticized powder is compared with the control described above:

Table I

| | Time and Temperature of Immersion in Water | D. C. Resistivity, Megohms/1,000 ft. | K value |
| --- | --- | --- | --- |
| Insulation of this Example | 1 day at 60° C | 16.1 | 61.9 |
| | 3 days at 50° C | 45.0 | 166.0 |
| Control | 1 day at 60° C | 13.8 | 46.0 |
| | 3 days at 50° C | 35.1 | 118.0 |

In a similar fashion free-flowing, pulverulent plasticized resin compositions can be made by the method of this invention from vinyl resins, including polyvinyl chloride and other vinyl chloride polymers. For example, 50 parts of di-1-methylheptyl phthalate may be incorporated into 100 parts of polyvinyl chloride by heating the resin to 220° F. by suspending the resin-plasticizer mixture in a stream of air heated from 250 to 270° F. for 1 second or less, and holding and mixing the heated resin at that temperature for about 1 minute. Similarly, 50 parts by weight of a plasticizer comprising a mixing of aliphatic acid diesters prepared from triethylene glycol and coconut oil may be incorporated in 100 parts by weight of polyvinyl chloride at a temperature of 220° F., a mixture of plasticizers comprising 59 parts by weight of tricresyl phosphate and 5 parts of di-2-ethylhexyl phthalate may be incorporated in 100 parts of polyvinyl chloride at 220° F., a mixture of plasticizers comprising 20 parts by weight of acetylated castor oil and 30 parts by weight of di-2-ethylhexyl phthalate may be incorporated in 100 parts by weight polyvinyl chloride at a temperature of 240° F., and 55 parts by weight of tri-octyl phosphate may be incorporated in 100 parts by weight of polyvinyl chloride at 240° F. In all cases dry, pulverulent resin compositions are obtained which are friable in "feel" and which can be admixed with dry and powdery compounding ingredients and coloring agents to form resin compositions especially adapted for extrusion. When these examples are repeated, however, using temperatures substantially lower than those shown, the methanol extraction test shows that plasticizer absorption is incomplete.

EXAMPLE II

A dry, freely flowing pulverulent resin containing absorbed plasticizer made as described in the first stage of Example I may be placed in a mulling machine of the type used to disperse pigments in paint and 7.0 parts by weight of fine calcined clay, 10 parts by weight of basic lead carbonate, and 0.75 part by weight of soft channel black per 100 parts of polyvinyl chloride added and the mixing continued for ten to fifteen minutes until a fine homogeneous mixture is obtained. The above carbon black-containing composition is extruded about a #14 copper wire, maintaining the temperature of the extruder barrel and the die tip at 350° F.

Samples of the above resin-covered wire are immersed in water for 1 day at 60° C. and for 3 days at 50° C. The D. C. resistivity at 60° C. is 27.1 megohms/1,000 ft. and the insulation resistance (K value) is 100.8; at 50° C. the D. C. resistivity of the carbon black-containing resin insulation is 9.0 megohms/1,000 ft. and the K value at 50° C. is 334. Thus, it is seen from a consideration of Examples I and II and by comparing these data with those in Table I that pulverulent resin compositions made by the method of this invention possess much better electrical properties than compounds produced from conventional mill-mixed materials.

EXAMPLE III

A plasticized pulverulent resin composition may be made from a polyvinyl chloride polymer of a particle size of 50 to 150 microns and 95% of which passed a 20 mesh screen. The air supply to the Venturi tube of the apparatus of Fig. 1 is adjusted in the range of 270 to 300° F. and the oily mealy resin-plasticizer mixture prepared as in Example I fed into the Venturi at the rate of 6 lbs./minute. The temperature obtained in the cyclone stparator is in the range of 205 to 219. The resulting resin-plasticizer powder is dry and friable in "feel" and does not stain an absorbent paper bag upon storage therein for 24 hours or more.

To 150 parts by weight of the pulverulent plasticized resin obtained in the air suspension step above, there is added 10 parts by weight of basic lead carbonate, 7 parts by weight of fine calcined clay and 1 part of a powdered red dye (known as Watchung Red toner) and the mixture mixed for 30 minutes in a muller of the type used in the paint industry having two 100 pound muller wheels rotating in a pan at about 40 R. P. M. and having scrapers or plows to return the material to the path of the mullers. The resulting red mixture is extruded about #14 wire. A similar recipe, except for 1 part of a royal blue dye substituted for the red dye, is similarly mixed and extruded about wire. In both cases the insulation exhibits a smooth glossy sheen and has even blue and red colors. Moreover, subsequent batches mixed according to the same recipe are identical in hue.

EXAMPLE IV

The foregoing examples have been concerned with the production of polyvinyl chloride compositions for cable or wire insulation. It is also possible to produce clear and transparent compositions from vinyl chloride copolymer resins by the method of this invention. To 100 parts of a dry pulverulent copolymer resin produced from a monomeric mixture containing 92.5% vinyl chloride and 7.5% vinylidene chloride there may be added 2.0 parts by weight of a stabilizer, 0.2 part of lead stearate, and 46.0 parts by weight of di-2-ethylhexyl phthalate plasticizer. The mixture may be thoroughly pre-mixed and the resulting mealy composition fed into the apparatus of Fig. 2. The air is supplied at 101 ft./sec. and 245° F. During the addition of the resin plasticizer mixture at the rate of 2 lbs./minute, the temperature of the air in the cyclone separator is 185 to 200° F. A dry, friable, free-flowing pulverulent resin composition results which does not stain paper storage bags in 24 hours or more.

To the dry and pulverulent resin obtained above, 0.15 part of a powdered resin composition containing 0.12% of a purple dye and 0.35 part of a powdered resin composition containing 0.13% of an Imperial blue organic dye (the latter materials being used to mask the slight natural yellow color of the resin so as to produce a colorless transparent extruded material) are added and the powdered materials blended as in previous examples. The blended composition is extruded in the form of a strap or belt. It is noted that the material does not jam or "bridge" in the hopper of the extruding machine. The surface of the extruded material is rich and glossy and the extruded material is clearer and more transparent than that of an extruded belt made from a mill-mixed and granulated stock of the same composition. Accordingly, from the foregoing examples it is seen that it is possible to produce a variety of compositions differing in color or filler content from a single plasticized pulverulent resin containing a basic amount of plasticizer and stabilizers.

The plasticizers which may be incorporated into the powdered or pulverulent vinyl resins by the method of this invention include those that are liquid at normal temperatures and those that liquefy at the plasticization temperatures employed in the process of this invention. The main classes of compounds which may be incorporated in vinyl resins by the method of this invention include esters, amides, ketones and ethers. Best results are obtained with the use of ester-type plasticizers, illustrative examples of which are di-2-ethylhexyl phthalate, dicyclohexyl phthalate, dimethylcyclohexyl phthalate. dibutoxyethyl phthalate, di-(n)-butyl phthalate, dilauryl phthalate, dimethyl glycol phthalate, octadecyl butyl phthalate, dihexyl phthalate, didodecyl phthalate, tricresyl phosphate, tributyl phosphate, tris-(beta-butoxyethyl) phosphate, trioctyl phosphate, dodecyl adipate, diethylene glycol adipate, dodecyl oleate, tetrahydrofurfuryl oleate, ethylene glycol oleate, butyl acetyl ricinoleate, di-2-ethylhexyl sebacate, octadecyl butyl succinate, 1,10-deca-methylene glycol dicaprylate, tributyl aconitate, butyl phthalyl butyl glycollate, diesters of triethylene glycol and aliphatic acids of 8 to 14 carbon atoms, acetylated castor oil, dilauryl oxalate, and others.

Excellent results can also be obtained by the use of amides, illustrative examples of which are: tetraethyl adipamide, N,N-dibutyl stearamide, methyl benzamide, n-mono-butyl benzene sulfonamide, N,N,N,N,-tetraethyl adipamide and others. Illustrative examples of ketone plasticizers which may be incorporated into powdery or pulverulent vinyl resins are tetrahydronaphthyl phenyl ketone, methyl naphthyl phenyl ketone, undecyl naphthyl ketone, xylyl undecyl ketone and others. In addition, other organic compounds such as amyl naphthalene, polyamyl naphthalene, tetrabutyl urea, benzylnapthalene, beta-phenoxymethyl tetralin, dibutyl thioglycollate, methylene bis-butyl thioglycollate and the like, may be incorporated in pulverulent vinyl resins by the method of this invention. The method of this invention may also be used to incorporate mixtures of one or more of the above plasticizers or with one or more of the other liquid or liquefiable plasticizing materials known to the art. It will be understood that the chemical nature of the plasticizer is in no way critical in this invention, it being necessary only that the chemical used be a plasticizer for the resin and that it be liquid at mixing temperatures.

Any of the powdered or pulverulent fillers, coloring materials, chemical stabilizers, age-resistors, reinforcing agents and the like, known to the vinyl resin art, may be incorporated into plasticized pulverulent resin compositions according to the method of this invention. For example, finely-divided calcined clays, carbon black, finely-divided precipitated zinc oxide, magnesium oxides, aluminum oxides, basic lead carbonates, magnesium carboates, finely-divided lead silicates, calcium silicates, ground whitings, fine ground barytes, lithopone, litharge, zinc carbonate, asbestos powder, waxes, diatomaceous earths, cobalt stearate and other lubricating materials, other resinous materials such as rosin, shellac and others may be incorporated into the plasticized, pulverulent resins by the methods of this invention.

The solid dry compounding ingredients to be suitable for incorporation into a plasticized pulverulent vinyl chloride resin by the method of this invention desirably should be in a finely-divided state, for example, an average particle size of 100 microns or less, preferably below 25 microns. The filler materials should be as finely-ground as possible, but the chemical compounding ingredients such as liquefy or melt under temperatures commonly used in processing need only be ground fine enough so as to be freely dispersible among the resin granules. All solid compounding ingredients should be free of lumps and agglomerates to prevent spots and spongy areas in extruded and molded products produced from the pulverulent resin composition.

The preplasticized, free-flowing pulverulent resin compositions of this invention have a number of advantages over compositions made by the conventional mill-mixing methods. In addition, the production of pulverulent extrusion and injection molding compositions by the method of this invention has the important advantage of reducing the mixing cost because of lower overhead, lower equipment cost and less floor space (due to the elimination of heavy milling machinery), and lower man-power requirements because of the continuous nature of the process. The method of this invention results in the production of resin molding and extrusion compositions having better electrical properties, better stability of color (makes possible the production of compositions having brighter and more delicate tints), and better heat and light stability. The use of the method of this invention also makes possible greater flexibility in processing in that it makes possible better control over color matching, reduces the number of compounds that need to be carried in stock because the user may add various fillers, dyes, modifying substances and stabilizers to certain basic recipes, the equipment cleaning time is reduced, and the dry pulverulent resin compositions may be used for many purposes such as for extrusion, calendering, or injection molding or may be dissolved in solvent for use in cements in coating operations.

Variations and modifications in the procedures and products herein described are possible without departing from the spirit and scope of the invention as defined by the appended claims.

I claim:

1. In a method of producing a free-flowing pulverulent resinous composition comprising a free-flowing pulverulent polymer of a monomeric material which contains a single $CH_2=C<$ group and undergoes addition polymerization to form a high molecular weight linear polymer, and a plasticizer therefor, the steps which comprise heating a body of gas substantially inert to the polymer and plasticizer to 175 to 340° F., moving said heated gas in a well-defined, vertically-disposed path at a velocity not in excess of 100 ft./sec. and not less than that which is required to support therein particles of said polymer ranging in size from about 10 to about 300 mesh and to permit movement of said particles along said path while maintaining a contact time between said polymer and said gas of less than 5 seconds, dispersing in said moving gas at one location in said path a moist homogeneous mixture of said pulverulent polymer and said plasticizer in such a manner as to cause said mixture to be transported along said pathway solely by the buoyant effects of said moving gas and collecting said polymer plasticizer mixture at another location in said path remote from the first said location.

2. In a method of producing a free-flowing pulverulent resinous composition comprising a free-flowing pulverulent polymer of a monomeric material comprising predominantly vinyl chloride and a plasticizer therefor, the steps which comprise heating a body of gas to 200 to 340° F., moving said heated gas in a well-defined, vertically disposed path at a velocity not in excess of about 100 feet per second and not less than that required to support therein particles of said resin ranging from about 10 to about 300 mesh and to permit movement of said particles along said path while maintaining a contact time of less than 5 seconds, dispersing in said moving gas at one location therein a moist homogeneous mixture of said pulverulent polymer and said plasticizer, transporting said dispersed mixture along said path until said pulverulent polymer has been heated to 200 to 250° F. and has absorbed a substantial proportion of said plasticizer, collecting said mixture at a second location on said path remote from said first location, holding said collected mixture at an elevated temperature of 200 to 250° F. until absorption of said plasticizer by said pulverulent polymer is substantially completed and finally cooling said mixture.

3. The method of claim 2 wherein the polymer is polyvinyl chloride.

WILLARD F. BIXBY.

REFERENCES CITED

The following references are of record in the file of this patent:

UNITED STATES PATENTS

| Number | Name | Date |
| --- | --- | --- |
| 2,245,040 | Marks | June 10, 1941 |
| 2,460,546 | Stephanoff | Feb. 1, 1949 |

Certificate of Correction

Patent No. 2,530,852 November 21, 1950

WILLARD F. BIXBY

It is hereby certified that error appears in the printed specification of the above numbered patent requiring correction as follows:

Column 4, line 64, for "prasticizer" read *plasticizer*; column 5, line 69, for the word "compound" read *compounding*; column 6, line 2, for "adding" read *added*; line 14, for "additional" read *addition*; line 24, strike out "vinyl acetate,"; line 30, for "chloroethyl" read *chlorethyl*; column 11, line 71, for "mixing" read *mixture*; column 12, line 62, for "stparator" read *separator*; column 14, line 44, for "carboates" read *carbonates*; column 16, line 34, for "completed" read *complete*;

and that the said Letters Patent should be read as corrected above, so that the same may conform to the record of the case in the Patent Office.

Signed and sealed this 13th day of March, A. D. 1951.

[SEAL]

THOMAS F. MURPHY,
*Assistant Commissioner of Patents.*